US007197471B2

(12) United States Patent
Cary et al.

(10) Patent No.: US 7,197,471 B2
(45) Date of Patent: Mar. 27, 2007

(54) SYSTEM AND METHOD FOR ASSESSING DEMOGRAPHIC DATA ACCURACY

(75) Inventors: Steven Harold Cary, Colorado Springs, CO (US); Bruce William Fogarty, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 09/942,635

(22) Filed: Aug. 30, 2001

(65) Prior Publication Data

US 2003/0046138 A1 Mar. 6, 2003

(51) Int. Cl.
*G06F 17/30* (2006.01)
(52) U.S. Cl. .............................. 705/10; 707/6; 707/200
(58) Field of Classification Search .................. 705/10
See application file for complete search history.

(56) References Cited

U.S. PATENT DOCUMENTS

| | | | | |
|---|---|---|---|---|
| 5,369,571 | A | | 11/1994 | Metts ........................ 364/401 |
| 5,404,509 | A | * | 4/1995 | Klein ......................... 707/101 |
| 5,956,724 | A | * | 9/1999 | Griffiths ..................... 707/101 |
| 6,061,658 | A | * | 5/2000 | Chou et al. .................. 705/10 |
| 6,070,147 | A | | 5/2000 | Harms et al. ................. 705/14 |
| 6,092,197 | A | | 7/2000 | Couiegnoux ................ 713/200 |
| 6,374,241 | B1 | * | 4/2002 | Lamburt et al. ............... 707/6 |
| 6,389,429 | B1 | * | 5/2002 | Kane et al. .................. 707/200 |
| 6,631,365 | B1 | * | 10/2003 | Neal et al. ..................... 707/2 |
| 6,745,211 | B2 | * | 6/2004 | Kabasakalian et al. ..... 707/204 |
| 6,985,926 | B1 | * | 1/2006 | Ferlauto et al. ............. 709/206 |

FOREIGN PATENT DOCUMENTS

| | | | |
|---|---|---|---|
| JP | 07262061 | A * | 10/1995 |
| JP | 11232149 | A * | 8/1999 |

OTHER PUBLICATIONS

Rabianski, The accuracy of economic?demographic projections made by private vendors of secondary data, Appraisal Journal, Apr. 1992, v.60, n.2, p. 170-177 (8 pages).*
Little, Auditing for database integrity, Journal of Systems Management, Aug. 1994, v.45, n.8, p. 6-10, [online], [retrieved Sep. 5, 2005 via DIALOG file 15:00895469] (8 pages).*
Wang, A product perspective on total quality management, Communications of the ACM, Feb. 1998, v.41, n.2, p. 58-65, [online], [retrieved Sep. 5, 2005 via DIALOG file 15:01569154] (9 pages).*
Baker, Mine over matter, Journal of Business Strategy, Jul./Aug. 1998, v.19, n.4, p. 22-26, [online], retrieved Sep. 5, 2005 via DIALOG file 15:01730804 (7 pages).*

* cited by examiner

*Primary Examiner*—Tariq R. Hafiz
*Assistant Examiner*—Peter Choi
(74) *Attorney, Agent, or Firm*—VanLeeuwen & VanLeeuwen; David A. Mim, Jr.

(57) ABSTRACT

A system and method for assessing demographic data accuracy from third party data vendors is provided. Third party demographic data is compared to self-reported demographic data; hence compared to data presumed to be accurate. Analysis is done on the comparison to determine the accuracy of the data and if bias exists in the results for a particular demographic population or geographic region. Demographic data from many third parties can be analyzed in the same way, and the results can be compared to each other to determine which third party has the most accurate demographic data elements.

15 Claims, 10 Drawing Sheets

Source File with Dummy Index
200

| Dummy Index | Name | Address |
|---|---|---|
| 1 | name A | address A |
| 2 | name B | address B |
| . | . | . |
| . | . | . |
| n | name N | address N |

Test File
220

| Dummy Index | Data Field 1 | Data Field 2 | Data Field 3 | Data Field 4 |
|---|---|---|---|---|
| 1 | element | element | element | element |
| 2 | element | element | element | element |
| . | . | . | . | . |
| . | . | . | . | . |
| n | element | element | element | element |

Reference File
250

| Dummy Index | Name | Address | Data Field 1 | Data Field 2 | Data Field 3 |
|---|---|---|---|---|---|
| 1 | name a | address a | element a1 | element a2 | element a3 |
| 2 | name b | address b | element b1 | element b2 | element b3 |
| . | . | . | . | . | . |
| . | . | . | . | . | . |
| n | name n | address n | element n1 | element n2 | element n3 |

*Figure 2*

SYSTEM AND METHOD FOR ASSESSING DEMOGRAPHIC DATA ACCURACY

BACKGROUND OF THE INVENTION

1. Technical Field

The present invention relates in general to a method and system for determining demographic data accuracy. More particularly, the present invention relates to a system and method for assessing the accuracy of selected demographic data elements that may be purchased from third party data vendors about households and individuals in those households.

2. Description of the Related Art

Understanding customers and what may explain their behavior and preferences is a primary factor in being successful in serving those customers. Because businesses typically have little information about their customers other than name, address, and transaction history, it is useful to add information about the customer from third party sources ("consumer appending" vendors).

Consumer data is compiled from a variety of sources including surveys, phone books, credit applications, public records, and other self-reported information. Consumer appending vendors attempt to complete a demographic profile of every household by combining data from these sources. However, due to the variety of sources used and the ability to match households across sources, there is some inherent level of inaccuracy. Reasons for inaccuracy range from misspellings to deliberate statements of misinformation.

There are some data inaccuracies that may not be overcome, although attempts are being made in improving the technology used in data compilation. Among these "data holes" are incompleteness, inaccuracy and mismatched data. For example, consumers often misunderstand survey questions or fill in the wrong blank by accident. Some of these errors are the result of programming mismatches, but many are related to the actual sources that contribute data to the data provider. Perfect data may not be possible, but techniques can be used to improve the accuracy of the data.

Data providers often use the term "data quality" to describe data accuracy. Data quality is further described in terms of Overall Match Rate, Elemental Match Rates, and Accuracy. These are often the factors that companies consider when purchasing data or conducting a test of data quality. Overall Match Rate refers to the number of records being received from the data provider with respect to the number being submitted for enhancement. The Overall Match rate is determined by matches on last name and address. Thus it is affected by the quality of these fields in data submitted for enhancement. Enhancement is defined as the addition of information to an individual consumer record (i.e., a "household"). For example, if a list of 1,000 customer names is sent to a data provider and the data provider returns data on 800 customer names, the overall match rate is 80%. This applies to the total number of records with appended data, not the number of data appended to each record. When comparing data providers, many companies find match rates to be an important variable, which is why consumer appending vendors often provide (at no cost to buyer) overall and data element match rates on a sample of data. Low match rates may mean that the data provider does not have a large enough representation of a customer base to provide the desired information. Elemental Match Rates refer to the number of elements requested for each record versus the total number of elements appended to a file. An element is a unit of data, a "demographic data field," such as age of householder, household income, whether a household owns or rents property, etc. One record will have many elements, one for each demographic field potentially appended. Some data providers have more elements in their database than others. For this reason, a company providing a 100% match rate but returning only half of the requested elements may not be the data provider of choice. Data elements may not be returned because they are not collected or, more likely, because the corresponding information could not be found; i.e., the data element is missing. It is also useful to look at the average number of elements returned per record for the elements provided. A 100% overall match rate with a 50% elemental match rate implies that ½ of the database for this element contains missing fields. Data providers often measure elemental match rate differently. Some providers measure elemental match rates as the ratio of elements appended to matched records. In the 1,000 record example described above, a data provider may measure an ordered element with 600 matches for a single element as 600/800 (800 matches). This computes to a 75% elemental match rate. Another provider may measure elemental match rate by the number of elements appended to the total records. In the example above, the elemental match rate using this method is 600/1000, or 60%.

Accuracy refers to how accurate the information is in the elements for the households. To determine the accuracy, a random sample of sufficient size is chosen from the total household record list. For example, if the total household list is nationwide, the sample chosen should not be from just one state, but from many states. The sample is then verified against a valid benchmark to determine the accuracy of the file.

A challenge found with existing art is that there is no comparable standard for assessing data accuracy between data vendors. Because of this, it is difficult to decide which data vendor is the right one for a given consumer list analysis. Some data vendors may be better than others in various areas. For example, Data Vendor A may have more accurate household financial information, while Data Vendor B may have more accurate household marital status information. What is needed, therefore, is a way to accurately compare demographic data between data vendors to determine which data vendor provides the best accuracy for a given consumer list.

SUMMARY

It has been discovered that, through comparative analysis, an assessment of the accuracy of selected data elements from consumer appending vendor files can be determined. This assessment indicates which data source is better for certain demographic data elements. A source file that includes records of households is used as a basis for analysis. The source file can be from a customer or can be a subset of a reference file. The reference file includes a large population of households in which phone calls or mailings have been made recently to the households to ensure data accuracy. The reference file is presumed to be accurate because the data it contains is self-reported by the households. The owner of the reference file provides dummy index numbers to attach to the comparison master file records. The purpose of these numbers is to insure that no one other than the reference file vendor knows which households were matched, in the case where the source file is not a subset of the reference file and to provide a way to trace a specific record in case there is a question about it. The source file and is sent to a consumer appending vendor to match by name and address, then to append demographic data. The test file is sent to the owner of the reference file, and the owner matches the test file demographic data to the reference file demographic data. A comparison master file is created from the results. The vendor of the reference file assigns a dummy index number to the individual records in this comparison master file. An analysis is performed on the comparison master file to determine the accuracy of the consumer appending vendor's demographic data in comparison to the known (presumed accurate) demographic data in the reference file.

The analysis determines the extent of bias that exists in the results as well the accuracy of consumer appending vendor files (at least with respect to those records tested). In this manner, a determination is made as to which demographic data is best suited to the customer's desired data requirements.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2 is a diagram showing the different types of data files used during analysis;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
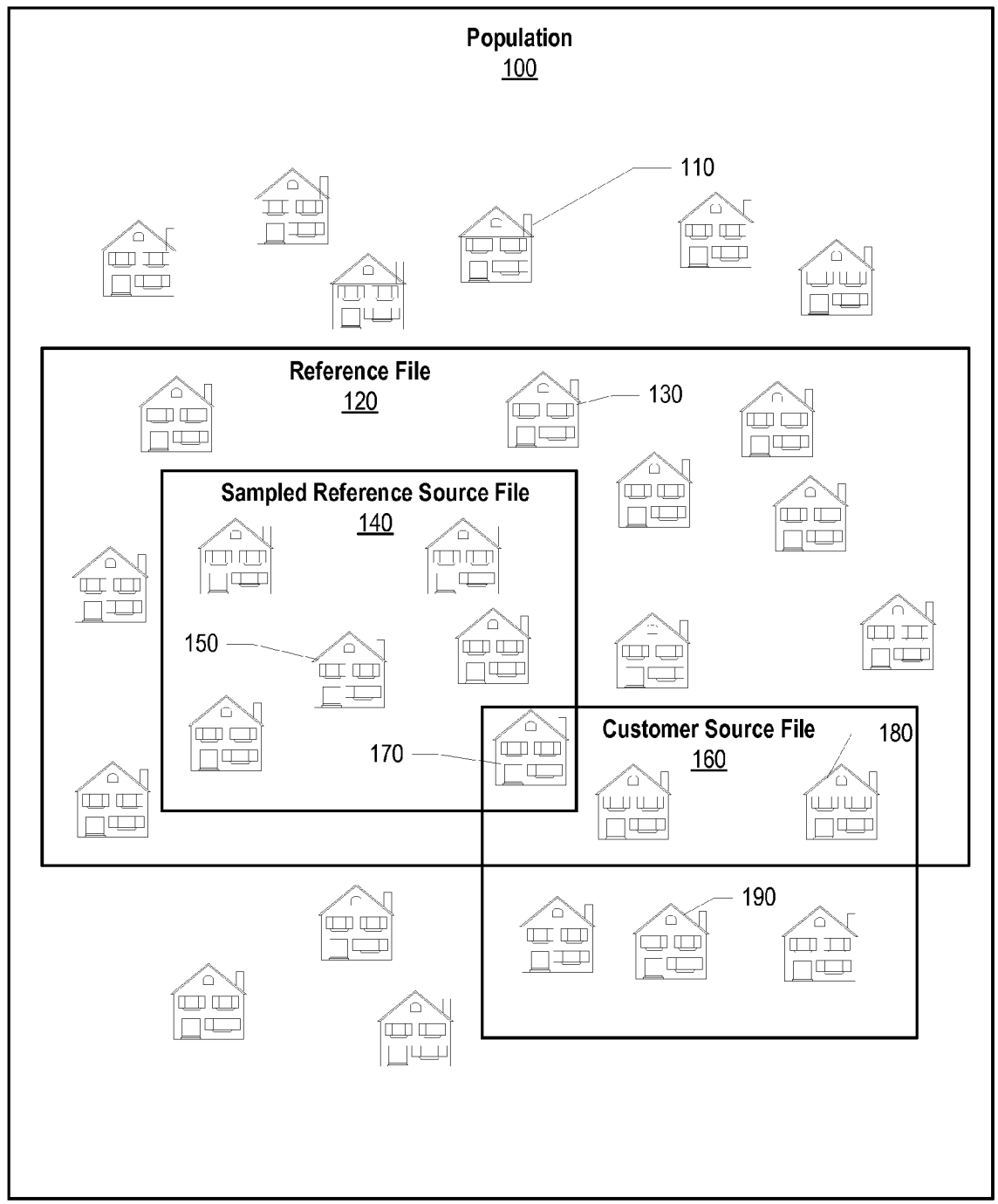
FIG. 1 is a diagram showing household population and segments of the population included in various sample files.

FIG. 1 is a diagram showing a household population and segments of the population. Population 100 includes a population in a large geographical area. For example, population 100 may represent households within the United States. Reference File 120 is a subset of population 100, and includes a large population of households with demographic data presumed to be accurate. For example, Reference File 120 may include households in urban areas. Household 110 is a farm in Nebraska outside a city and therefore not part of reference file 120. Sampled Reference Source File 140 is a subset of Reference File 120. It could either be stratified (a subset with certain characteristics) or random. Following from the example described above, stratified-sample reference source file 140 may include households within major cities in the United States. Household 130 is in the small town of Plymouth, Ind. and is not part of sampled reference source file 140 because Plymouth, Ind. is not a major city. However, stratified-sample reference source file 140 includes Household 150 in Los Angeles, Calif. and Household 170 in Pittsburgh, Pa. A random sample would be a subset that is pulled randomly from the reference file (and thus would be similar in characteristics to the entire reference file from which it is pulled).

Customers may be interested in obtaining demographic data for a specific area of the country. Using the example above, customer source file 160 represents the East Coast of the United States. Customer Source File 160 includes Household 170 in Pittsburgh and Household 180 which is in Stafford, Va. Notice that Household 170 is also included in Sampled Reference Source File 140 because Pittsburgh is a major city, while Household 180 is not in Sampled Reference Source File 140 because Stafford is not a major city. Customer Source File 160 also includes Household 190 which is a farmhouse in Maine. However, Household 190 is not included in reference file 120 because it is not in an urban area. When customers provide source files, measures are taken to ensure that a sufficient number of the customers' households are included in the reference file in order to obtain a sufficient sample size from the reference file.

FIG. 2 is a diagram showing the different types of data files being used during analysis. Source File 200 includes records of households for which demographic data is obtained. Name Data Field 210 and Address Data Field 215 include the names and addresses of households for which demographic data is retrieved and analyzed. For example, name A 212 lives at address A 217. Dummy index Data Field 205 is added to source file 200 to maintain confidentiality of the vendor's data throughout the analysis. For example, Source File 200 is provided to a data vendor to obtain data information about the households. The data vendor provides Test File 220 that includes dummy index 225. The name and address are removed from the test file in order to maintain confidentiality of the vendor's data throughout the analysis. The data vendor provides demographic data in categories for each household in Source File 200. For example, Data Field 1 230, Data Field 2 235, Data Field 3 240, and Data Field 4 245 can be demographic data categories such as marital status, income, number of pets, and the number of children in the household, etc. Each household record includes elements for the various categories. For example, Element 248 includes data of record 246 for Data Field 1 230.

Reference File 250 includes household information that is presumed to be accurate. Reference File 250 includes dummy index 252 that is used to match Test File 220 households to Reference File 250 households. The reference file also includes Name 255 and Address 260. Data Field 1 265, Data Field 2 270, and Data Field 3 275 are categories similar to test file 220 categories, but may not be the same. For example, test file 220 may have Data Field 1 230 as income level in increments of $20,000, whereas Reference File 250 may have Data Field 1 265 as income in increments of $10,000. During the analysis of the files, the categories are re-binned to sort out data field discrepancies. Following the example described above, Reference File 250's income data field may be aligned two increments to every Test File 220's income data field one increment.

Figure 3:
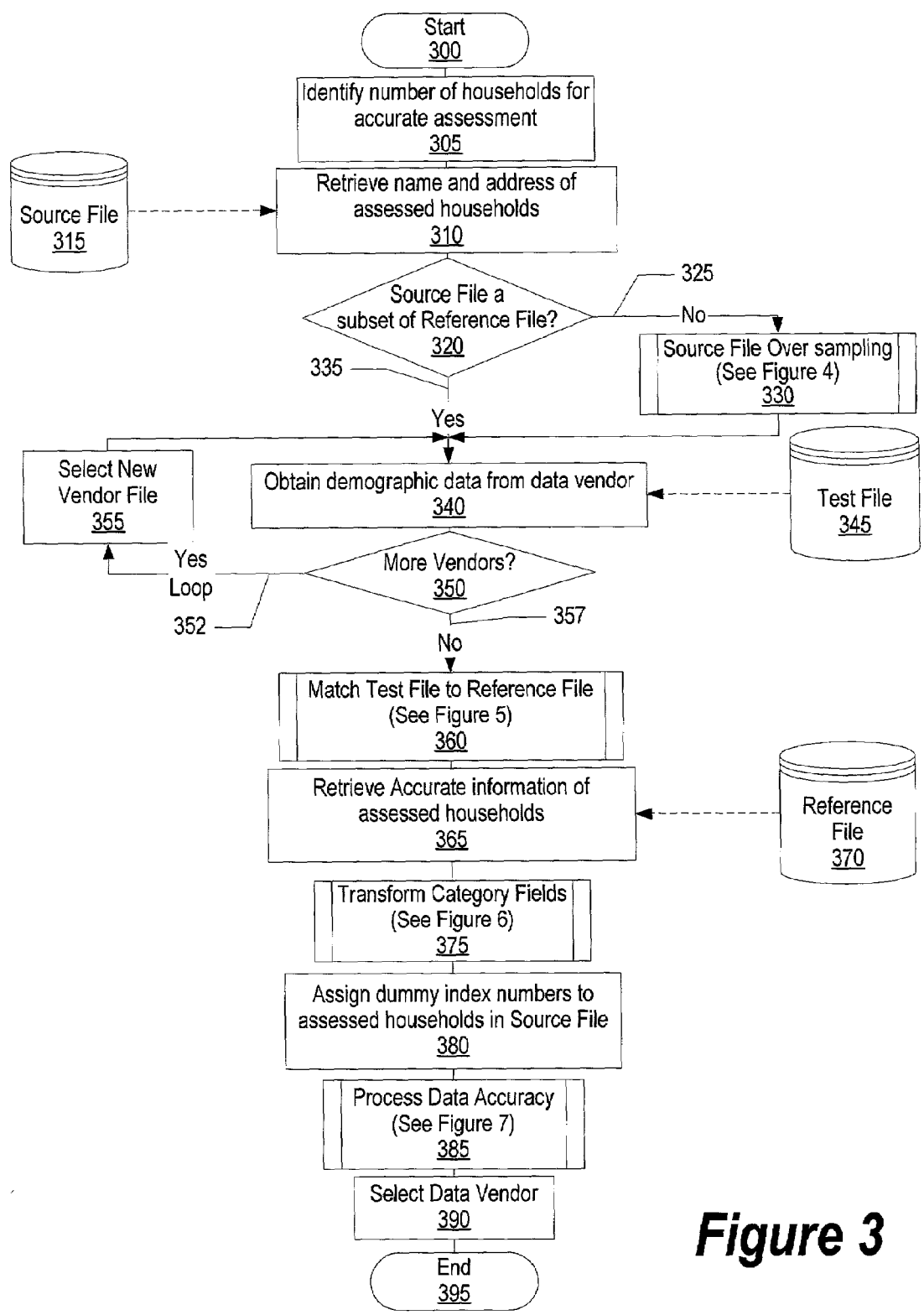
FIG. 3 is a high-level flowchart showing the analysis steps in determining the accuracy of a vendor data file.

FIG. 3 is a high-level flowchart showing the steps used in determining the accuracy of a vendor data file. Processing commences at 300, whereupon a number of households for an accurate assessment are identified (step 305). The number of identified households depends on the amount of accuracy and how large the sample size is preferred. The name and address of the identified households are retrieved from source file 315. A determination is made as to whether the source file is a subset of the reference file (decision 320). If the source file is not a subset of the reference file, decision 320 branches to "No" branch 325 whereupon source file oversampling is performed (pre-defined process block 330, see FIG. 4 for further details). For example, if many households are not in the reference file, matching results will be poor and the vendor data accuracy will not be adequately assessed. By oversampling the data vendor file, more households are identified in the reference file and a better assessment of vendor data accuracy is possible. On the other hand, if the source file is a subset of the reference file, decision 320 branches to "Yes" branch 335 whereupon demographic data elements about the households are retrieved from data vendor test file 345 (step 340).

A determination is made as to whether there are more data vendor files for analysis (decision 350). If there are more data vendor files to analyze, decision 350 branches to "Yes" branch 352 which loops to select a new vendor file (step 355). This looping continues until there are no more vendor files to analyze, at which point decision 350 branches to "No" branch 357. The households in the vendor test file and the households in the reference file are matched (pre-defined process block 360, see FIG. 5 for further details). Accurate demographic elements about each household are retrieved from reference file 370 (step 365). The Data Field fields are transformed to ensure that the element comparisons are performed correctly (pre-defined process block 375, see FIG. 6 for further details. For example, the reference file may have income ranges every $5,000, whereas the vendor test file may have income ranges every $10,000. The Data Field fields are also sorted so that proper element comparisons are performed. For example, the test file may call an element "Homeowner Status" while the reference file may call the element "Owner-Renter Status". Once the data fields are transformed, a dummy index is assigned to each household record in the source file (step 380). The data comparison is processed for accuracy (pre-defined process block 385, see FIG. 7 for further details). A vendor is selected based upon previous comparative analysis (step 390) and processing ends at 395.

Figure 4:
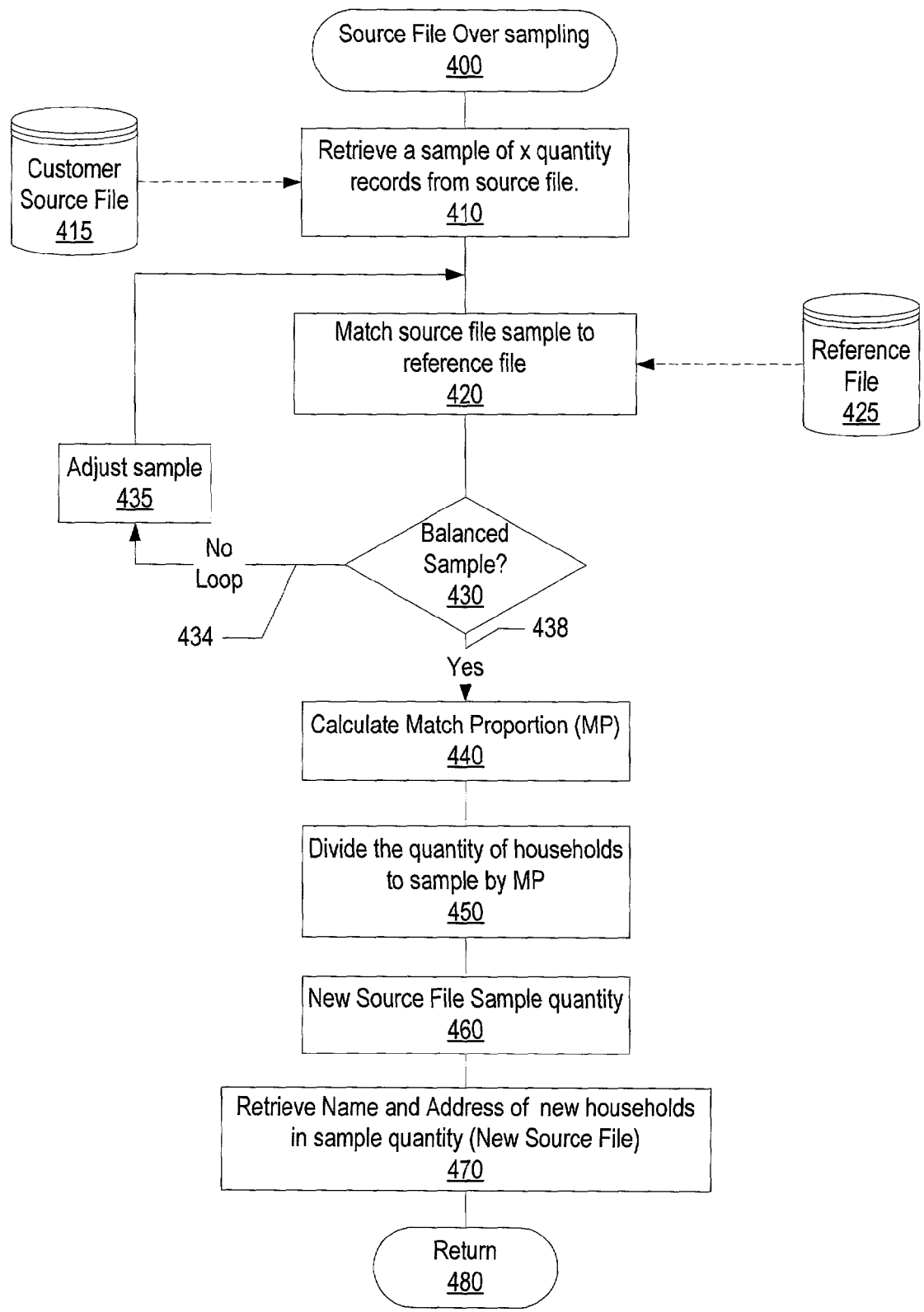
FIG. 4 is a flowchart showing the source file oversampling process.

FIG. 4 is a flowchart showing the source file oversampling process. This process helps to ensure that the source file has enough matching households to the reference file. When the source file is provided by a customer and is not a subset of the reference file, oversampling of the source file ensures that a sufficient match of the reference file is possible. Source file oversampling commences at 400, whereupon a sample of "x" quantity is retrieved from customer source file 415 (step 410). The quantity "x" is dependent upon the number of households being analyzed. The customer source file sample is matched against reference file 425 (step 420) to determine how many households from the sampled source file are in the reference file. A determination is made as to whether the sample is balanced (decision 430). A balanced sample properly represents the households being analyzed.

For example, if the analysis is based on the United States population, the sample is balanced if it represents the United States population. If the sample represented one state, or a specific income level, the sample would be unbalanced. If the sample is not balanced, decision 430 branches to "No" loop 434 whereupon the sample is adjusted (step 435) and the sample is matched again to the reference file. Processing loops back to match the adjusted sample (step 420). This looping continues until the sample is matched, at which point decision 430 branches to "Yes" branch 438 whereupon the Match Proportion (MP) is calculated (step 440). The Match Proportion is the number of households that match in the sample file divided by the total number of households in the sample file. The Match Proportion (MP) is used to calculate how much oversampling is preferred in order to achieve a certain match rate to the Reference File. The quantity of households being analyzed is divided by the MP (step 450), which equates the new source file sample quantity to meet the preferred match rate. For example, if the sample file contains 1,000 households, and the number of households that match are 40, the MP is 4% (40/1,000). If 10,000 households is the desired match level, the new source file sample quantity is 250,000 households (10,000/0.04). The name and address of the additional households are retrieved (250,000 in this example) (step 470) and processing returns at 480.

Figure 5:
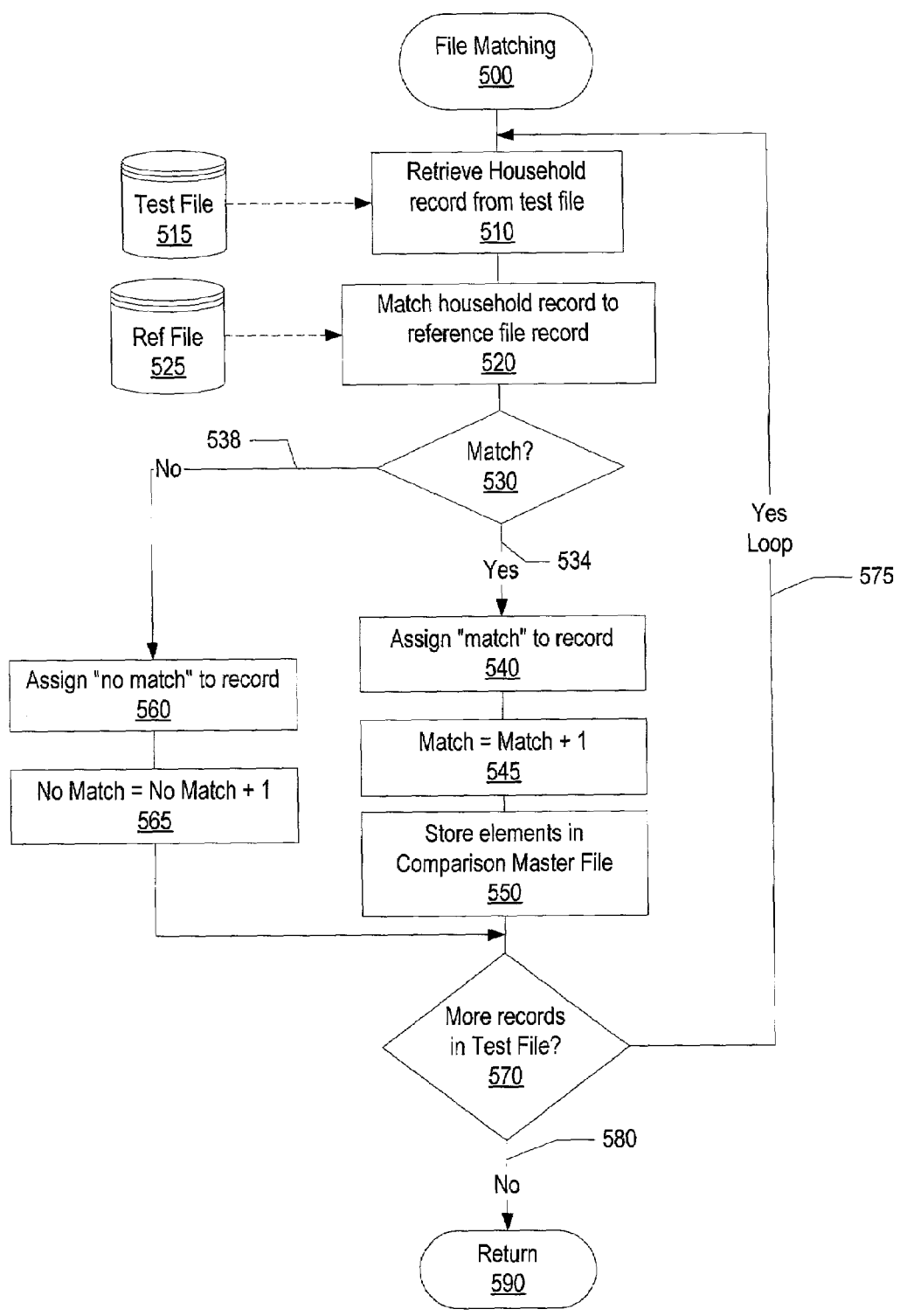
FIG. 5 is a flowchart showing the matching of the vendor data test file to the reference file.

FIG. 5 is a flowchart showing the matching of the vendor test data file against the reference file. File matching commences at 500, whereupon a household record is retrieved from vendor test file 515 (step 510). The household record is matched to reference file 525 (step 520) and a determination is made as to whether there is a match (decision 530). If the household record does not match a record in the reference file, decision 530 branches to "No" branch 538 whereupon "no match" is assigned to the record (step 560) in a comparison master file and the number of no match records is incremented by one (step 565). The comparison master file is a file that includes information about whether a household matches the reference file for each household in the test file and also includes the elements of the household if they match. On the other hand, if the household record does match a record in the reference file, decision 530 branches to "Yes" branch 534 whereupon "match" is assigned to the record (step 540) in the comparison master file and the number of match records is incremented by one (step 545). The elements are stored in the comparison master file (step 550) and a determination is made as to whether there are more records in the test file (decision 570). If there are more records, decision 570 branches to "Yes" branch 575 whereupon processing loops back to process the next household record from test file 515. This processing continues until there are no more records to evaluate, at which point decision 570 branches to "No" branch 580 whereupon processing returns at 590.

Figure 6:
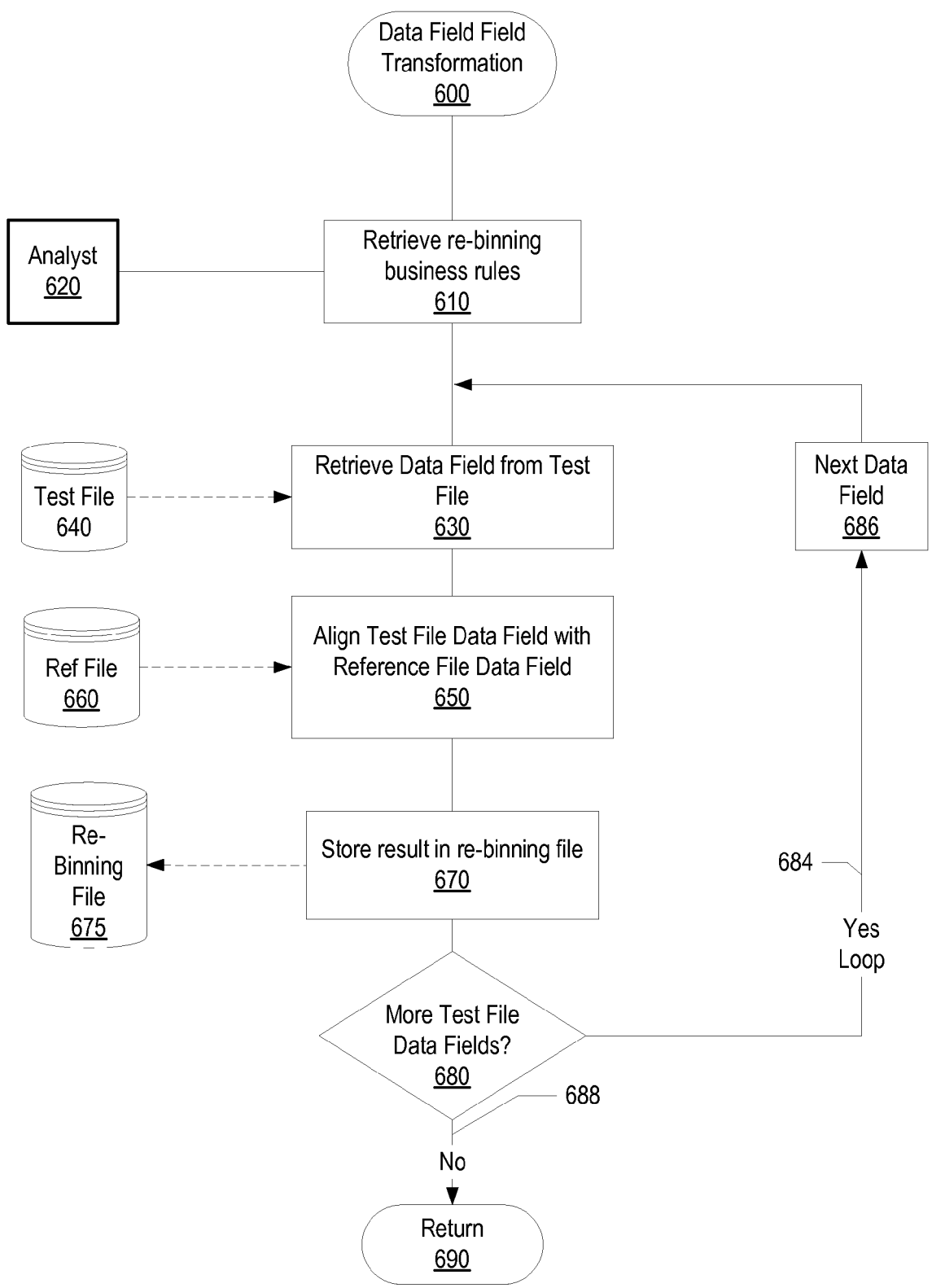
FIG. 6 is a flowchart showing the re-binning process of data field fields.

FIG. 6 is a flowchart showing the re-binning process of Data Field fields. It is possible that the reference file and test file have different categorical values. The re-binning process allows the categories to be properly compared to each other. Data Field transformation commences at 600, whereupon the re-binning business rules are retrieved from analyst 620. Business rules will vary depending on the sources of the test file Data Field data. A Data Field is retrieved from test file 640 (step 630) and aligned with a Data Field from reference file 660 (step 650). The alignment results are stored in Re-binning file 675 (step 670) and a determination is made as to whether more data fields are in the test file (decision 680). If more data fields are in the test file, decision 680 branches to "Yes" branch 684 whereupon processing loops back to select the next Data Field (step 686) and process the next Data Field from test file 640. This processing continues until there are no more data fields to align with the reference file, at which point decision 680 branches to "No" branch 688 whereupon processing returns at 690.

Figure 7:
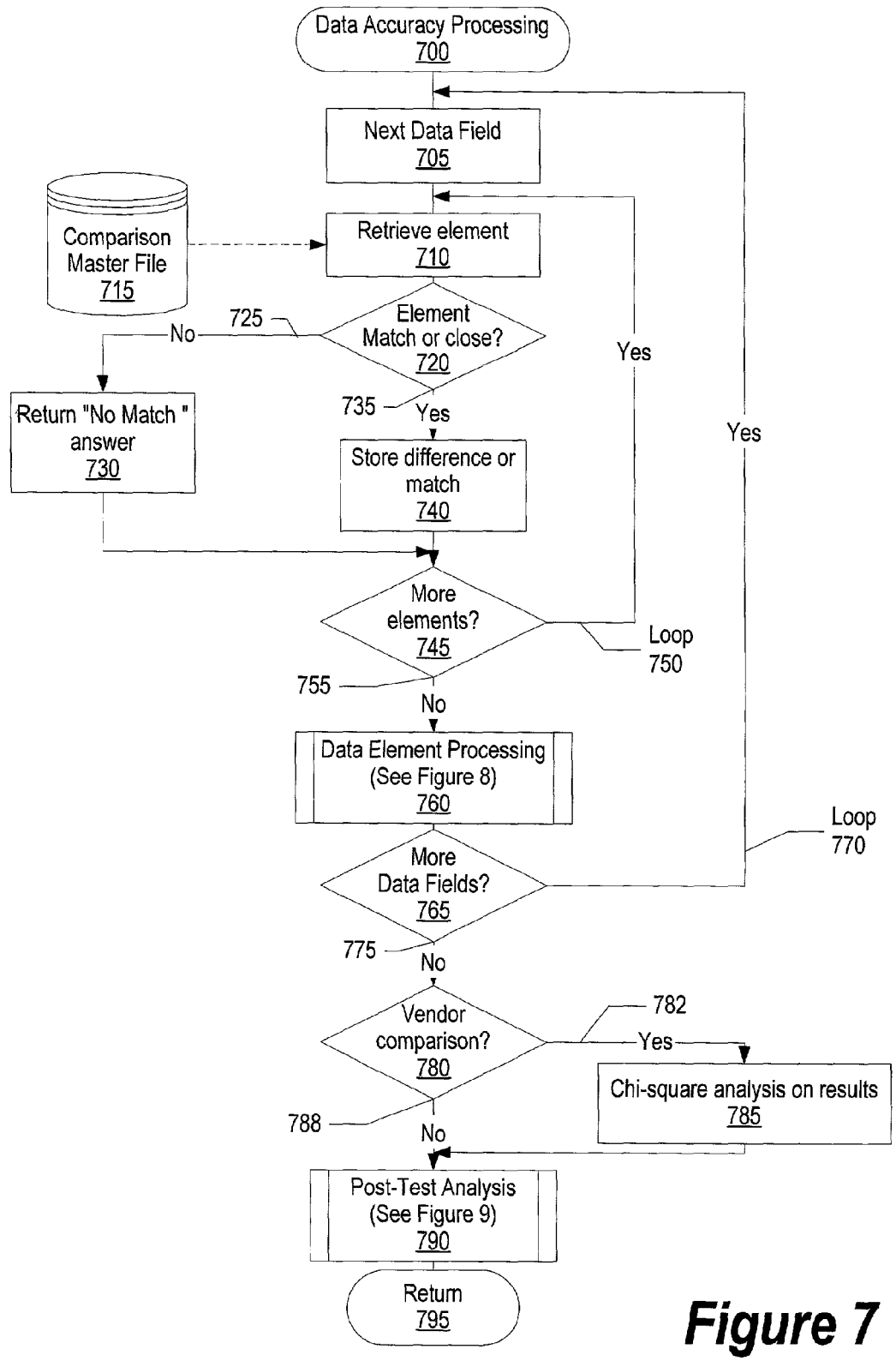
FIG. 7 is a flowchart showing the analysis of data elements.

FIG. 7 is a flowchart showing the analysis of data elements. Data accuracy processing commences at 700, whereupon a data field is selected (step 705). The reference file element and test file element pertaining to the data field are retrieved from comparison master file 715 (step 710). A determination is made as to whether the test file element matches or is approximately equal to the reference file element (decision 720). Certain data fields are allowed to be approximate and not match completely. For example, if the data field being analyzed is income, the business rules might be included to count it as a match if the test file data field is within $10,000. If the test file element does not match or is not approximate to the reference file element, decision 720 branches to "No" branch 725 whereupon a "no match" is returned. On the other hand, if the test file element matches or is approximate to the reference file, decision 720 branches to "Yes" branch 735 whereupon the match is stored (step 740). A determination is made as to whether there are more household records in the comparison master file to analyze for the selected Data Field (decision 745). If there are more households to analyze, decision 745 branches to "Yes" branch 750 which loops back to process the next record. This looping continues until there are no more households to analyze for the selected data field, at which point decision 755 branches to "No" branch and the results of the elements in the data field are processed (pre-defined process block 760, see FIG. 8 for further details). A determination is made as to whether there are more data fields to analyze in the comparison master file (decision 765). If there are more data fields to analyze, decision 765 branches to "Yes" branch 770 whereupon processing loops back to select and process the next data field. This looping continues until there are no more data fields to analyze in the comparison master file, at which point decision 765 branches to "No" branch 775 whereupon a determination is made as to whether the test results will be used to compare data vendors (decision 780). If the results are used to compare data vendors, decision 780 branches to "Yes" branch 782 whereupon chi-square analysis is used on the test results (step 785). On the other hand, if the test results are not used to compare data vendors, decision 780 branches to "No" branch 788 whereupon post-test analysis takes place (pre-defined process block 790, see FIG. 9 for further details) and processing returns at 795.

Figure 8:
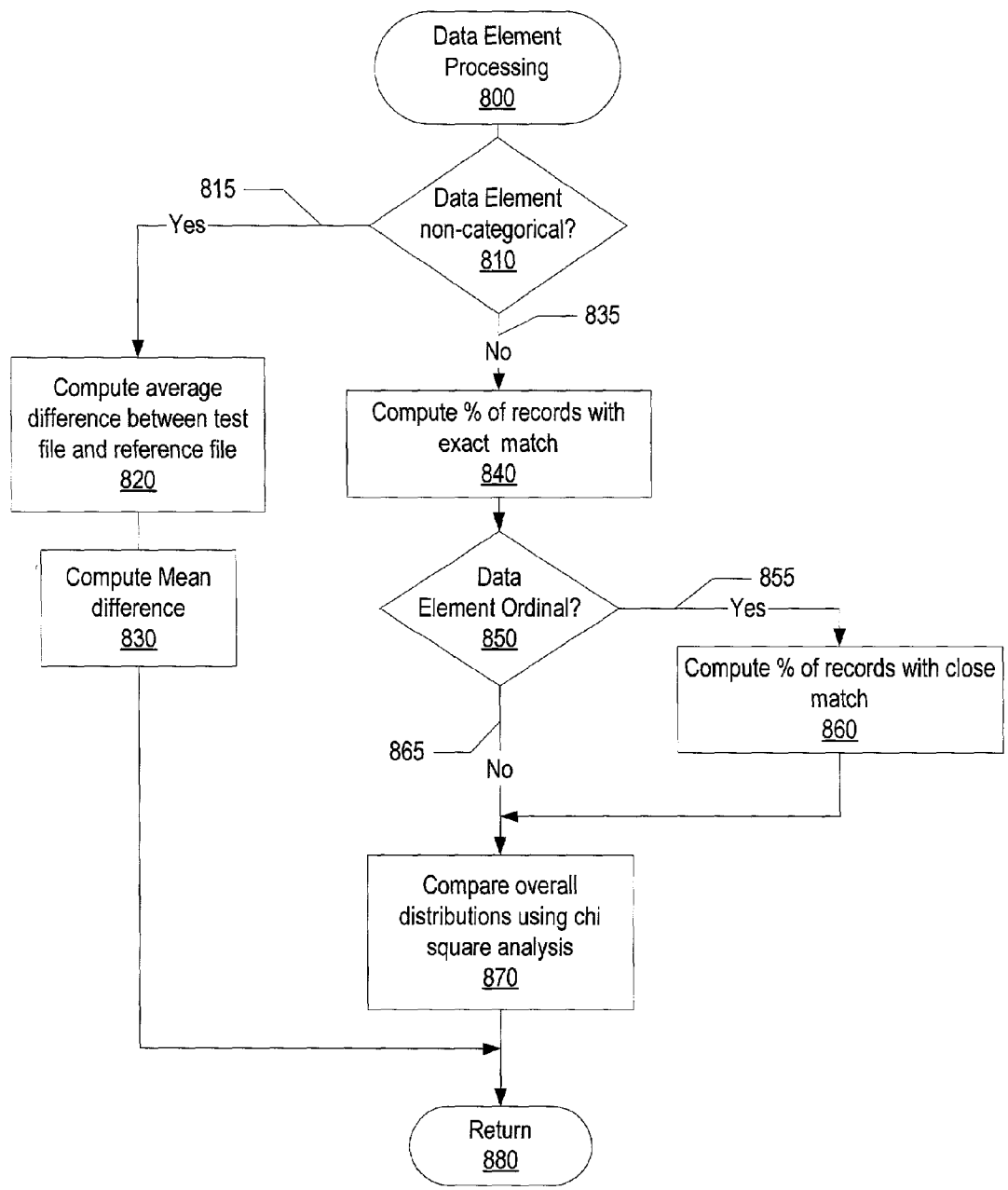
FIG. 8 is a flowchart showing the processing steps for various data fields.

FIG. 8 is a flowchart showing the processing steps for various data elements (i.e., data fields or variables). Data element processing commences at 800, whereupon a determination is made as to whether the data element being analyzed is non-categorical (decision 810). For example, the age of the head-of-household may be a numeric and non-categorical field, where the marital status may be a categorical field. If the data element is non-categorical, decision 810 branches to "Yes" branch 815 whereupon the average difference between the test file elements that are analyzed and reference file element are calculated (step 820). The mean difference of the test file result is calculated at step 830. On the other hand, if the data element is categorical, decision 810 branches to "No" branch 835 whereupon the percentage of records with exact match is calculated (step 840). A determination is made as to whether the data element is ordinal (decision 850). For example, a data element is ordinal if it includes numbers that have meaning in terms of order, but their differences or ratios are not meaningful. If the data element has values related numerically, decision 850 branches to "Yes" branch 855 whereupon the percentage of records with close match is calculated (step 860). For example, the analyst may want to have the household income level data element related numerically so that if the test file element value is close to the reference file value (e.g., one ordinal level off), it is counted as a match. On the other hand, if the data element is not ordinal, decision 850 branches to "No" branch whereupon test file element distributions are calculated using chi-square analysis (step 870) and processing returns at 880.

Figure 9:
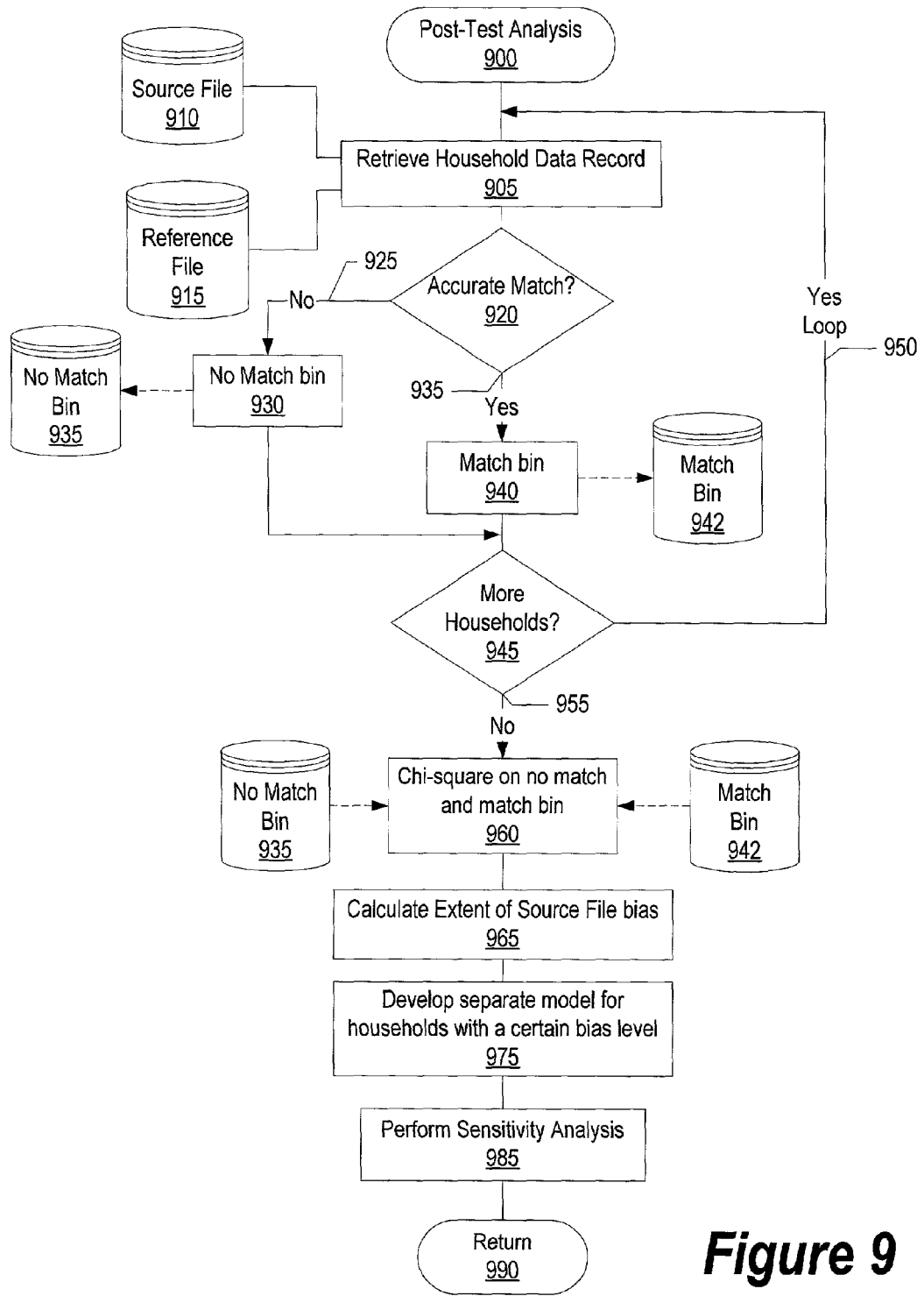
FIG. 9 is a flowchart showing the post-test analysis of the source file.

FIG. 9 is a flowchart showing the post-test analysis of the source file. Post-test analysis commences at 900, whereupon a household data record is retrieved from source file 910 and reference file 915 (step 905). A determination is made as to whether the source file record and reference file record match (decision 920). If the source file record and reference file record do not match, decision 920 branches to "No" branch 925 whereupon the source file record is stored in a No Match Bin 935 (step 930). On the other hand, if the source file record and reference file record match, decision 920 branches to "Yes" branch 935 whereupon the source file record is stored in a Match Bin 942 (step 940). A determination is made as to whether there are more households in the source file (decision 945). If there are more households in source file 910, decision 945 branches to "Yes" branch 950 which loops back to process the next household record. This looping continues until there are no more households in the source file to analyze, at which point decision 945 branches to "No" branch 955. Chi-square analysis is performed on No Match bin 935 and Match Bin 942 to determine the extent of the source file bias (step 960). For example, the chi-square analysis may statistically show that the source file matched records for households with children much better than for households without children. The extent of the source file bias is calculated (step 965) and a separate model is developed for households with a certain bias level (step 975). The bias level threshold may be determined by the analyst and may be changed for different circumstances. For example, a customer may be interested in one Data Field, but not interested in another. If bias exists for a data field that the customer is not interested in, there may be no need to develop a separate model. However, if bias exists for a data field that the customer is interested in, a separate model may be useful for further analysis. A sensitivity analysis is performed on the analysis results (step 985) and processing returns at 990. For example, the sensitivity analysis may answer what contribution the appended data made from the reference file to a model scoring customers for a target marketing campaign, for example. Two models can be compared on the same set of households. One model uses the appended data and the other model does not use the appended data.

Figure 10:
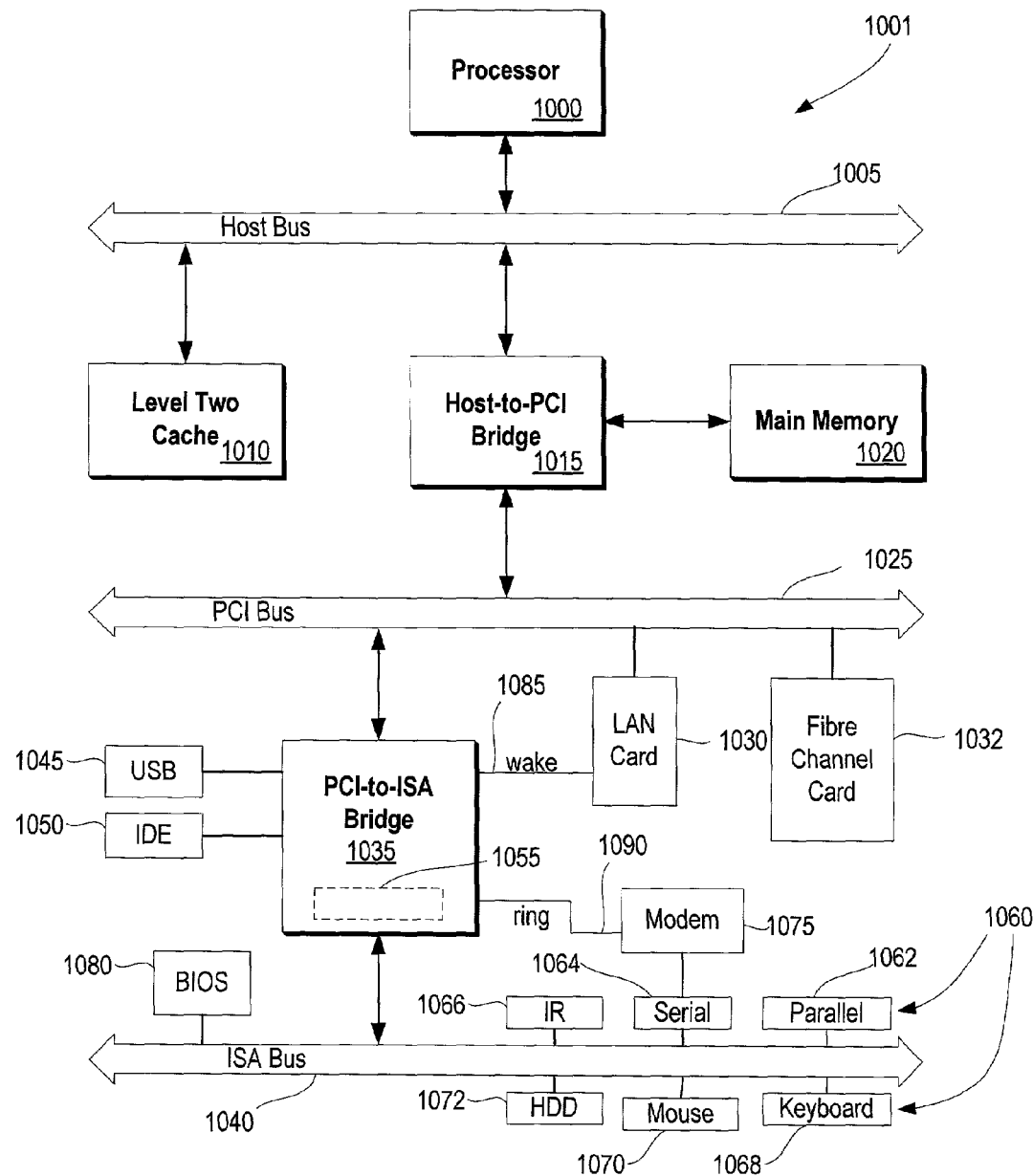
FIG. 10 is a block diagram of an information handling system capable of implementing the present invention.

FIG. 10 illustrates information handling system 1001 which is a simplified example of a computer system capable of performing the server and client operations described herein. Computer system 1001 includes processor 1000 which is coupled to host bus 1005. A level two (L2) cache memory 1010 is also coupled to the host bus 1005. Host-to-PCI (Peripheral Component Interconnect) bridge 1015 is coupled to main memory 1020, includes cache memory and main memory control functions, and provides bus control to handle transfers among PCI bus 1025, processor 1000, L2 cache 1010, main memory 1020, and host bus 1005. PCI bus 1025 provides an interface for a variety of devices including, for example, Local Area Network (LAN) card 1030. PCI-to-ISA (Industry Standard Architecture) bridge 1035 provides bus control to handle transfers between PCI bus 1025 and ISA bus 1040, universal serial bus (USB) functionality 1045, Intelligent Drive Electronics (IDE) device functionality 1050, power management functionality 1055, and can include other functional elements not shown, such as a real-time clock (RTC), Direct Memory Access (DMA) control, interrupt support, and system management bus support. Peripheral devices and input/output (I/O) devices can be attached to various interfaces 1060 (e.g., parallel interface 1062, serial interface 1064, infrared (IR) interface 1066, keyboard interface 1068, mouse interface 1070, and fixed disk (HDD) 1072) coupled to ISA bus 1040. Alternatively, many I/O devices can be accommodated by a super I/O controller (not shown) attached to ISA bus 1040.

Basic input/output system (BIOS) 1080 is coupled to ISA bus 1040, and incorporates the necessary processor executable code for a variety of low-level system functions and system boot functions. BIOS 1080 can be stored in any computer readable medium, including magnetic storage media, optical storage media, flash memory, random access memory, read only memory, and communications media conveying signals encoding the instructions (e.g., signals from a network). In order to attach computer system 1001 to another computer system to copy files over a network, LAN card 1030 is coupled to PCI bus 1025 and to PCI-to-ISA bridge 1035. Similarly, to connect computer system 1001 to an Internet Service Provider (ISP) to connect to the Internet using a telephone line connection, modem 1075 is connected to serial port 1064 and PCI-to-ISA Bridge 1035.

While the computer system described in FIG. 10 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a Compact Disc-Read-Only Memory (CD ROM)) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of analyzing a data source that includes a plurality of household records, wherein the data source is determined to not be a subset of a reference file that includes a plurality of reference file records, said method comprising:

retrieving, from a nonvolatile storage area, a sample quantity of household records included in the data source, wherein the sample quantity of household records does no include all of the plurality of household records included in the data source;

comparing a name and address included in each of the sample quantity of household records to the plurality of reference file records, the comparing resulting in matched household records whose name and address are included in one or more of the sample quantity of household records and also included in one or more of the reference file records;

determining, based upon the matched household records, whether the data source is balanced, signifying that the matched household records represents the data source;

adjusting, based upon determining whether the data source is balanced, the sample quantity of household records such that, after performing again the comparing and the determining using the adjusted sample quantity of household records, the matched records corresponding to the adjusted sample quantity of household records is balanced and represents the data source;

generating a comparison master file based upon the adjusted sample quantity of household records, the comparison master file including a portion of the plurality of household records included in the data source;

analyzing, the comparison master file using the reference file;

selecting a data source vendor corresponding to the data source in response to the analyzing; and providing the selection of the data source vendor to a user.

2. The method as described in claim 1 wherein the generating further comprises:

determining a match proportion based on the adjusted sample quantity of household records and the matched household records corresponding to the adjusted sample quantity of household records;

calculating a new source file sample quantity by dividing the adjusted sample quantity of household records by the match proportion; and matching the name and address of the household records included in the new source file sample quantity to the reference file records, the matching resulting in the comparison master file.

3. The method as described in claim 1 further comprising:

retrieving a rule corresponding to an element in the data source;

determining whether the element in the data source approximates a corresponding value in the reference file based on the retrieved rule; and assigning match to the element in response to the determination.

4. The method as described in claim 1 further comprising:

calculating a first bias value based upon matching one or more elements of household records included in the comparison master file to one or more elements included in the reference file records.

5. The method as described in claim 4 further comprising:

calculating a second bias value based upon matching one or more elements of household records from a second data source to one or more of the reference file records; and wherein the selecting includes comparing the first bias value to the second bias value.

6. An information handling system comprising:

one or more processors;

a memory accessible by the processors;

one or more nonvolatile storage devices accessible by the processors;

a data source handling tool to manage a data source stored on one of the nonvolatile storage devices that includes a plurality of household records, wherein the data source is determined to not be a subset of a reference file that includes a plurality of reference file records, the data source handing tool including: means for retrieving, from a nonvolatile storage area, a sample quantity of household records included in the data source, wherein the sample quantity of household records does no include all of the plurality of household records included in the data source;

means for comparing a name and address included in each of the sample quantity of household records to the plurality of reference file records, the comparing resulting in matched household records whose name and address are included in one or more of the sample quantity of household records and also included in one or more of the reference file records;

means for determining, based upon the matched household records, whether the data source is balanced, signifying that the matched household records represents the data source;

means for adjusting, based upon determining whether the data source is balanced, the sample quantity of household records such that, after performing again the comparing and the determining using the adjusted sample quantity of household records, the matched records corresponding to the adjusted sample quantity of household records is balanced and represents the data source;

means for generating a comparison master file based upon the adjusted sample quantity of household records, the comparison master file including a portion of the plurality of household records included in the data source;

means for analyzing, the comparison master file using the reference file;

means for selecting a data source vendor corresponding to the data source in response to the analyzing; and means for providing the selection of the data source vendor to a user.

7. The information handling system as described in claim 6 further comprising:

means for determining a match proportion based on the adjusted sample quantity of household records and the matched household records corresponding to the adjusted sample quantity of household records;

means for calculating a new source file sample quantity by dividing the adjusted sample quantity of household records by the match proportion; and means for matching the name and address of the household records included in the new source file sample quantity to the reference file records, the matching resulting in the comparison master file.

8. The information handling system as described in claim 6 further comprising:

means for retrieving a rule corresponding to an element in the data source;

means for determining whether the element in the data source approximates a corresponding value in the reference file based on the retrieved rule; and means for assigning match to the element in response to the determination.

9. The information handling system as described in claim 6 further comprising:

means for calculating a first bias value based upon matching one or more elements of household records included in the comparison master file to one or more elements included in the reference file records.

10. The information handling system as described in claim 9 further comprising:

means for calculating a second bias value based upon matching one or more elements of household records from a second data source to one or more of the reference file records; and wherein the selecting includes comparing the first bias value to the second bias value.

11. A computer program product stored on a computer operable media, the computer operable media containing instructions for execution by a computer, which, when executed by the computer, cause the computer to implement a method for selecting a data source vendor by analyzing a data source that includes a plurality of household records, wherein the data source is determined to not be a subset of a reference file that includes a plurality of reference file records, the method comprising:

retrieving, from a nonvolatile storage area, a sample quantity of household records included in the data source, wherein the sample quantity of household records does no include all of the plurality of household records included in the data source;

comparing a name and address included in each of the sample quantity of household records to the plurality of reference file records, the comparing resulting in matched household records whose name and address are included in one or more of the sample quantity of household records and also included in one or more of the reference file records;

determining, based upon the matched household records, whether the data source is balanced, signifying that the matched household records represents the data source;

adjusting, based upon determining whether the data source is balanced, the sample quantity of household records such that, after performing again the comparing and the determining using the adjusted sample quantity of household records, the matched records corresponding to the adjusted sample quantity of household records is balanced and represents the data source;

generating a comparison master file based upon the adjusted sample quantity of household records, the comparison master file including a portion of the plurality of household records included in the data source;

analyzing, the comparison master file using the reference file;

selecting a data source vendor corresponding to the data source in response to the analyzing; and providing the selection of the data source vendor to a user.

12. The computer program product described in claim 11 wherein the method further comprises:

determining a match proportion based on the adjusted sample quantity of household records and the matched household records corresponding to the adjusted sample quantity of household records;

calculating a new source file sample quantity by dividing the adjusted sample quantity of household records by the match proportion; and matching the name and address of the household records included in the new source file sample quantity to the reference file records, the matching resulting in the comparison master file.

13. The computer program product as described in claim 11 wherein the method further comprises:

retrieving a rule corresponding to an element in the data source;

determining whether the element in the data source approximates a corresponding value in the reference file based on the retrieved rule; and assigning match to the element in response to the determination.

14. The computer program product described in claim 11 wherein the method further comprises:

calculating a first bias value based upon matching one or more elements of household records included in the comparison master file to one or more elements included in the reference file records.

15. The computer program product described in claim 14 wherein the method further comprises:

calculating a second bias value based upon matching one or more elements of household records from a second data source to one or more of the reference file records; and wherein the selecting includes comparing the first bias value to the second bias value.

* * * * *